United States Patent [19]
Muir

[11] Patent Number: 5,831,573
[45] Date of Patent: Nov. 3, 1998

[54] METHOD AND APPARATUS CONTINOUSLY OFFSETTING SURVEY POINTS BY HALF ANGLE CALCULATIONS IN REAL TIME IN THE FIELD

[75] Inventor: Craig D. Muir, Strowan, New Zealand

[73] Assignee: Trimble Navigation Limited, Sunnyvale, Calif.

[21] Appl. No.: 702,735

[22] Filed: Aug. 23, 1996

[51] Int. Cl.[6] ................................................. G01S 5/02
[52] U.S. Cl. ............................................................ 342/357
[58] Field of Search .............................. 342/357; 701/213

[56] References Cited

U.S. PATENT DOCUMENTS

| | | | |
|---|---|---|---|
| 4,972,591 | 11/1990 | Hammet | 33/293 |
| 5,166,878 | 11/1992 | Poelstra | 364/424.01 |
| 5,375,663 | 12/1994 | Teach | 172/4.5 |
| 5,379,045 | 1/1995 | Gilbert et al. | 342/357 |
| 5,392,521 | 2/1995 | Allen | 33/293 |
| 5,414,462 | 5/1995 | Veatch | 348/135 |
| 5,506,588 | 4/1996 | Diefes et al. | 342/357 |
| 5,512,905 | 4/1996 | Nichols et al. | 342/357 |
| 5,550,743 | 8/1996 | Krytsos | 364/449 |

OTHER PUBLICATIONS

Trimble Navigation Limited Survey & Mapping Division, Trimlac User's Manual, 2–92 –2–93 (1996).
Jeff Hurn, Trimble Navigation Limited, GPS: A Guide to the Next Utility (1989).
Trimble Navigation Limited Survey and Mapping, Trimlac User's Manual, 2–92 –2–93 (1996).

*Primary Examiner*—Gregory C. Issing
*Attorney, Agent, or Firm*—Blakely, Sokoloff, Taylor & Zafman

[57] ABSTRACT

A method and apparatus for determining an offset path from an actual path using a mobile surveying device. In one embodiment, a sequence of continuous measured points is generated using a satellite positioning system included with the disclosed mobile surveying device. Offset points are computed relative to the measured points using half angle calculations. Each offset point is computed relative to the middle point of three continuous measured points generated by the satellite positioning system along the actual path. The offset points are continuously generated with the mobile surveying device in real time and in the field.

20 Claims, 5 Drawing Sheets

METHOD AND APPARATUS CONTINOUSLY OFFSETTING SURVEY POINTS BY HALF ANGLE CALCULATIONS IN REAL TIME IN THE FIELD

BACKGROUND OF THE INVENTION

1. Field of the Invention

The present invention relates generally to land surveying devices and more specifically, the present invention relates to satellite positioning system based land surveying.

2. Description of the Related Art

Land surveyors measure precise positions on the earth's surface to determine the boundaries, area, or elevations of real property. Early surveyors used devices such as ropes or chains for distance measurements between reference points. Distance measurements are now frequently measured with electronic distance measurement (EDM) instruments which determine the time for sound or light to travel to a reflector and back. This type of method requires the beam of sound or light to be emitted from the EDM instrument positioned at a first location and reflected back by a prism mounted on a pole at the second location. This measurement technique is a traditional method of accurately determining distances and locating specific physical locations and generating new physical positions on the earth's surface.

More recently, satellite positioning system based receivers have been used in land surveying devices. One example of a satellite positioning system based receiver is a global positioning system (GPS) receiver. GPS receivers use signals received from overhead satellites to determine navigational data such as position and velocity. GPS signals are available throughout the world and may be used to determine precise positions on the earth's surface. The GPS is a constellation of 24 satellites which orbit the earth at a very high altitude. Each satellite emits a unique signal which may be received by GPS receivers on earth. The satellites are deployed in twelve hour orbits and are dispersed in six orbital planes. By simply receiving the signal from four or more orbiting GPS satellites, a properly configured GPS receiver can accurately determine its position.

GPS based receivers are useful in land surveying applications in that precise positions on the earth's surface can be determined by a land surveyor without the need for a second surveyor to stand at a second reference point. That is, the precise location of any position may be measured by a single land surveyor by physically positioning the GPS based receiver at that particular location and measuring its position.

One problem with the GPS based surveying devices and the other more traditional land surveying techniques discussed above is that reference points being surveyed must be physically occupied by the land surveyor and the surveying equipment. This requirement is problematic in instances where it is physically impractical to occupy directly a reference point to be measured. One prior art solution to the problem of being unable to physically occupy a reference point to be measured is to measure offset points. In particular, land surveyors can measure the locations of actual points near the reference points desired to be measured by using the prior art techniques discussed above. Once the locations of the actual points are measured, the point desired to be measured may be characterized as an offset point from the actual point which was measured. This prior art technique requires the field surveyor to make a note of the required offset and the reference point actually measured. The field surveyor then passes the information on to an office technician who then calculates the required offset points in, for example, personal computer based office software. A disadvantage with this prior art technique is that it is inefficient and inconvenient to require the field surveyor to take notes of actual locations and offsets while in the field and then pass the information to the office technicians after returning from the field.

One prior art solution to these problems is to determine offset points while in the field and thus eliminate the need for the land surveyor to take notes in the field and later pass the information to an office technician for subsequent processing. To illustrate, FIG. 1 shows an offset path 103 made up of offset points 105. It is noted that offset points 105 need not be directly occupied by a land surveyor to be measured. Instead, the land surveyor may traverse actual path 101 and measure measured points 107 to determine offset points 105. Each offset point in offset path 103 is located at a constant offset distance X from a corresponding measured point. For instance, offset point OS1 is located at a constant offset distance X from measured point M2.

A problem with the prior art technique shown in FIG. 1 is that offset points 105 are determined by a simple offset distance X at a right angle to the direction of travel. To illustrate, the land surveyor transverses along actual path 101 as indicated by measured points 107. The land surveyor first measures measured point M1 and then measures measured point M2. Next, offset point OS1 is calculated at a constant offset distance X at a right angle to the direction of travel as shown in FIG. 1. Next, the land surveyor continues to traverse along actual path 101 and measures point M3. Accordingly, offset point OS2 is calculated to be at the constant offset distance X from M3 at a right angle to the direction of travel as shown in FIG. 1. Afterwards, the land surveyor continues to traverse along actual path 101 and measures points M4 through M7 and offset points OS3 through OS6 are calculated correspondingly. As is apparent from FIG. 1, the prior art technique used to determine offset path 103 does not result in a fair approximation of actual path 101 in a winding path of travel. That is, offset path 103 does not match closely with actual path 101. In particular, the distances and angles between offset points 105 of offset path 103 do not fairly approximate the corresponding distances and angles between corresponding measured points 107 of actual path 101.

Thus, what is desired is an improved method and apparatus for computing offset points from an actual path in real time while the land surveyor is in the field. The computed offset points would form an offset path which fairly approximates the actual path traversed by the land surveyor. Such a method and apparatus would provide continuous offsetting which allows the calculation and storage of points offset from points actually measured. For survey and mapping purposes, this allows the measurement of line segments which could not otherwise be occupied directly.

SUMMARY OF THE INVENTION

A method and an apparatus for determining an offset path from an actual path is disclosed. In one embodiment, a sequence of continuous measured points are measured along an actual path wherein the sequence of continuous measured points are generated using a satellite positioning system. Preceding, middle and subsequent measured points are sequentially assigned in the sequence of continuous measured points. An offset point is computed immediately after the subsequent point is measured. The offset point corresponds with the middle measured point. In addition, the offset point is computed using a half angle calculation relative to the middle measured point and the preceding and subsequent measured points. The offset point is included in the offset path. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for determining an offset path from an actual path with a mobile surveying device is disclosed. In the following description, numerous specific details are set forth in order to provide a thorough understanding of the present invention. It will be apparent, however, to one having ordinary skill in the art that the specific details need not be employed to practice the present invention. In other instances, well known materials or methods have not been described in order to avoid obscuring the present invention.

Figure 1:
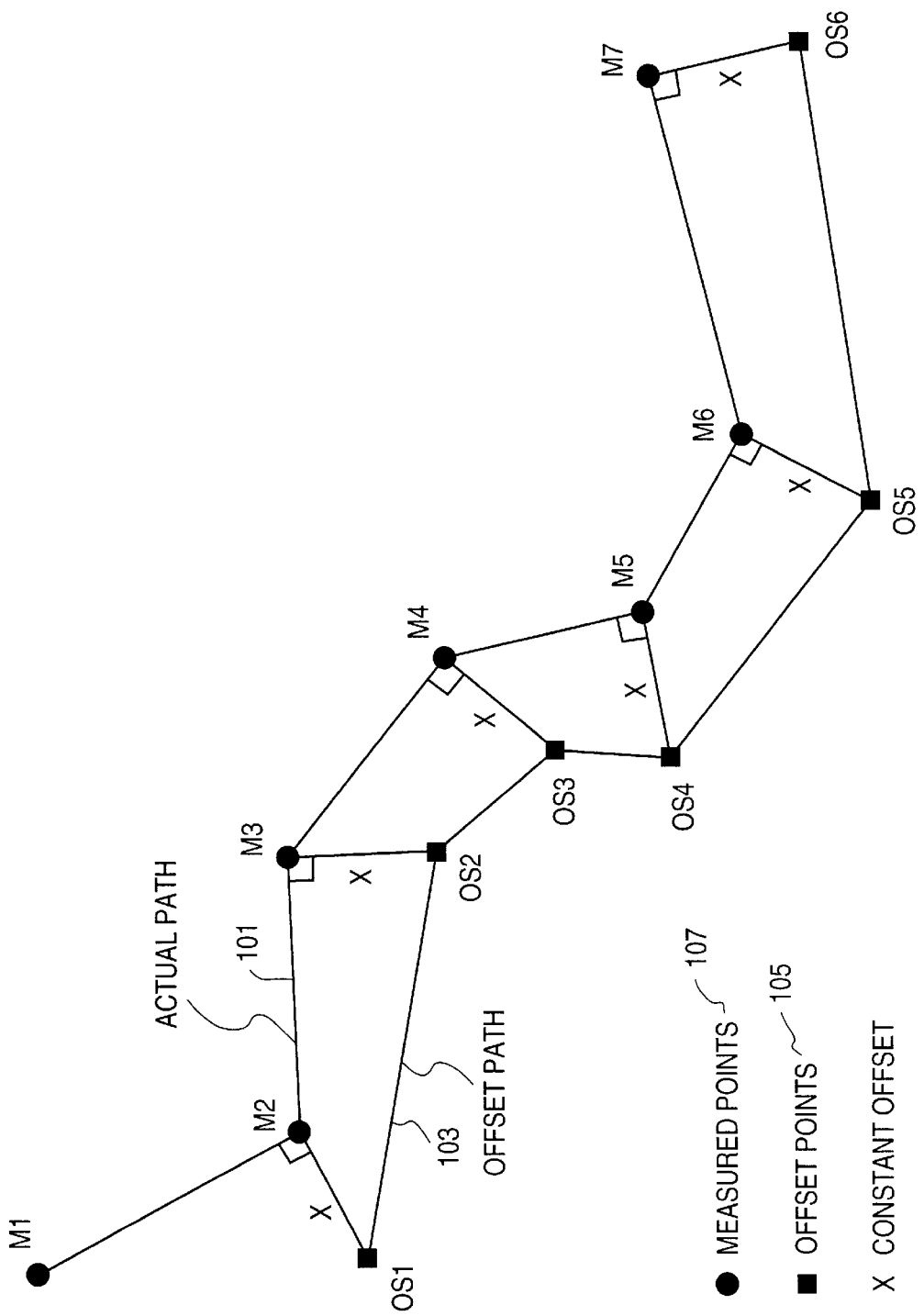
FIG. 1 shows a prior art method for determining an offset path from an actual path.
Figure 2:
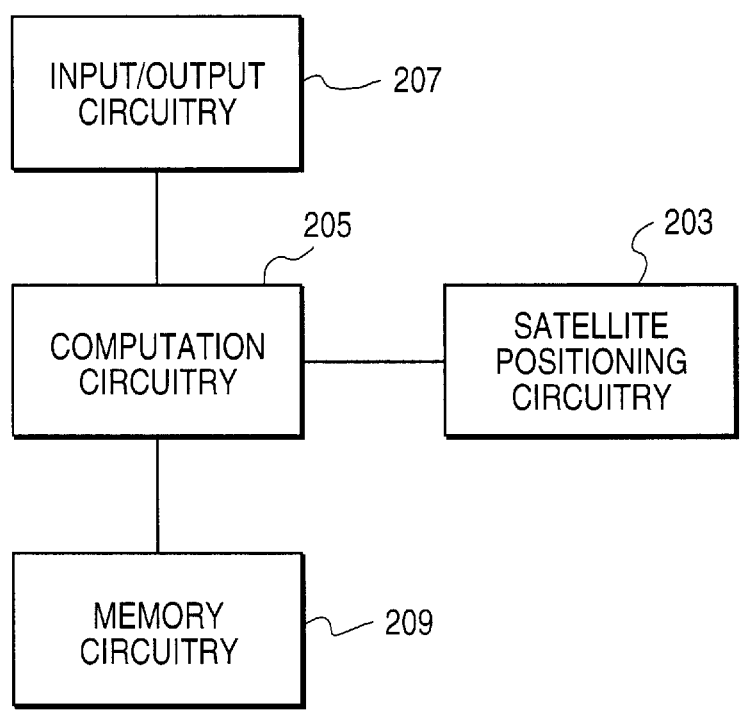
FIG. 2 shows a block diagram of an apparatus for determining an offset path from an actual path in accordance with the teachings of the present invention.

FIG. 2 is a block diagram illustrating components of a portable surveying device 201 in accordance with the teachings of the present invention. Surveying device 201 includes satellite positioning system circuitry 203 coupled to computation circuitry 205. Satellite positioning system circuitry 203 provides precise location information to computation circuitry 205. Input/output circuitry 207 is coupled to computation circuitry 205 for entering and reporting information to and from an operator. Computation circuitry 205 is configured to compute selectively continuous offset points from a sequence of continuous measured points received from satellite positioning system circuitry 203. As will be discussed in greater detail below, the offset points computed by computation circuitry 205 are determined using a half angle calculation which results in an offset path made up of the offset points. As will also be discussed in greater detail below, the offset path computed with the present invention is an improved approximation of the actual path in comparison with prior art methods used to compute offset points of an offset path in real time in the field. The actual points and offset points are stored in memory circuitry 209 which are coupled to computation circuitry 205. The stored actual points and offset points may be retrieved from memory circuitry 209 through input/output circuitry 207 for subsequent use and analysis.

In one embodiment of the present invention, surveying device 201 is a hand held mobile surveying device which allows an operator to perform real time surveying. In addition to allowing the measurement of an actual path occupied directly by an operator, the embodiment includes an option which provides continuous storage with memory circuitry 209 to calculate and store points that are offset from the actual measured points received from satellite positioning system circuitry 203. The embodiment provides continuous offsetting which enables the operator to measure selectively a line, or an offset path, that cannot be occupied directly. In the embodiment, a global positioning system (GPS) is used for satellite positioning system circuitry. It is appreciated that other types of satellite positioning systems, such as GLONASS, pseudolites or the like, may be used so long as precise measurements of actual points are provided with satellite positioning system circuitry 203 in the mobile surveying device 201.

Figure 3:
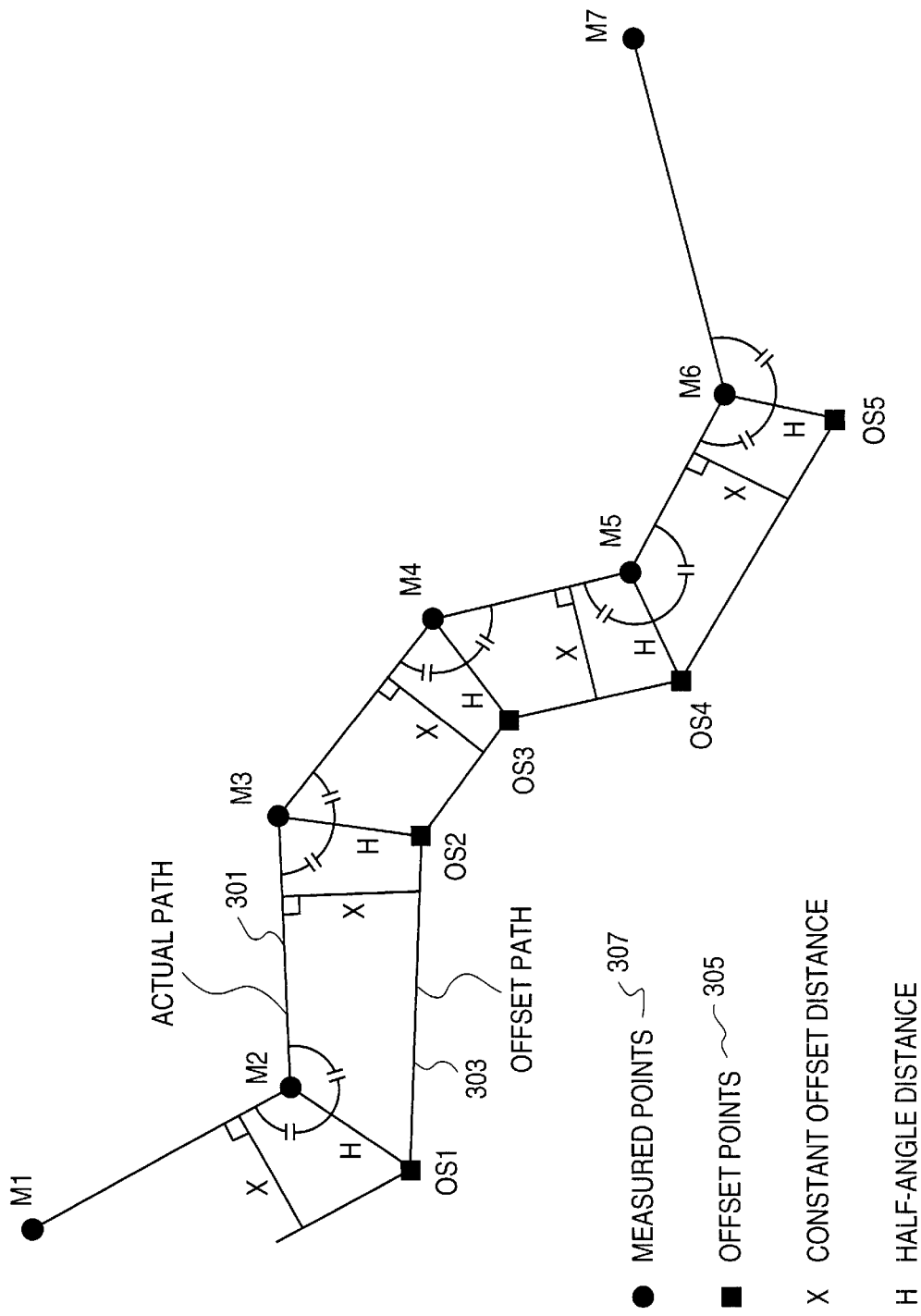
FIG. 3 shows an offset path measured from an actual path in accordance with the teachings of the present invention.

FIG. 3 is an illustration of a continuous offset path 303 derived from actual path 301 using the present invention. An operator utilizing the presently described mobile surveying device traverses along actual path 301. Continuous offset points 305 are computed relative to measured points 307 with a right angle offset distance of X measured from actual path 301. Offset points 305 located along the half angle, are computed continuously and are stored in real time as the surveyor traverses actual path 301. The present invention allows the surveyor to walk along actual path 301, measuring measured points 307 at predefined distances and times. Measured points 307 are used to calculate remote points at a constant predefined offset to the direction of travel.

In accordance with the teachings of the present invention, each continuous offset point is computed in real time in the field using a half angle calculation from a center point and its preceding and subsequent points. Referring specifically to measured points M1, M2 and M3, offset point OS1 is computed using a right angle constant offset distance X measured from the line defined by M1 and M2 and located at a half angle distance H from M2, where the half angle distance H is measured at half angles between the two line segments formed with M1 and M2 and M2 and M3. Similarly, offset point OS2 is computed using a right angle constant offset distance X measured from the line segment formed with M2 and M3 and located at a half angle distance H from measured point M3 with a half angle calculation relative to the preceding and subsequent points of measured point M3. Since measured points M1 through M7 are continuous points which form actual path 301, offset path 303 may be formed with continuous offset points OS1 through OS5 as shown in FIG. 3. It is appreciated that since offset points 305 are computed using half angle calculations from measured points 307, offset path 303 is a much improved approximation of the winding path of travel in actual path 301.

When the continuous offset option of one embodiment of the present invention is enabled, at least three continuous points are measured and an offset direction and distance are specified for real time continuous offsetting in the field. The offset distance includes a horizontal offset distance and a vertical offset distance. As soon as three continuous points have been measured, a half angle calculation is done to determine the direction in which the offset point lies from the middle point of the three measured points. It is appreciated that the offset point is computed as soon as the third point of the three measured points is computed. Thus, the present invention computes the offset points in real time while the surveyor is in the field. As soon as the surveyor measures the next measured point, the next offset point can be computed.

Figure 4A:
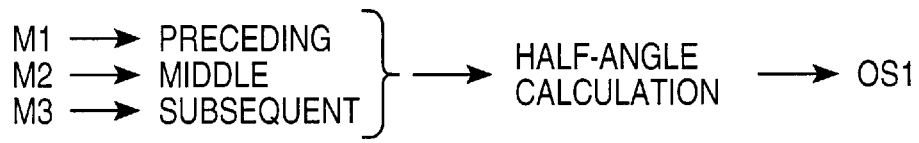
FIG. 4A shows a first offset point computed from preceding middle and subsequent points in accordance with the teachings of the present invention.
Figure 4B:
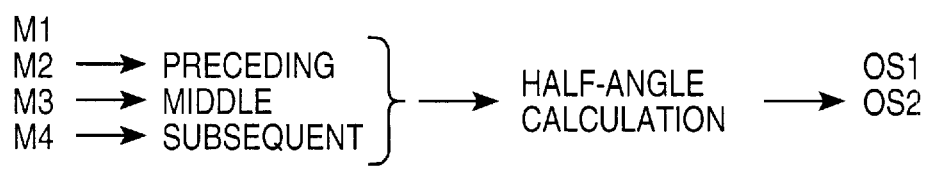
FIG. 4B shows a second offset point being computed from preceding, middle and subsequent measured points in accordance with the teachings of the present invention.
Figure 4C:
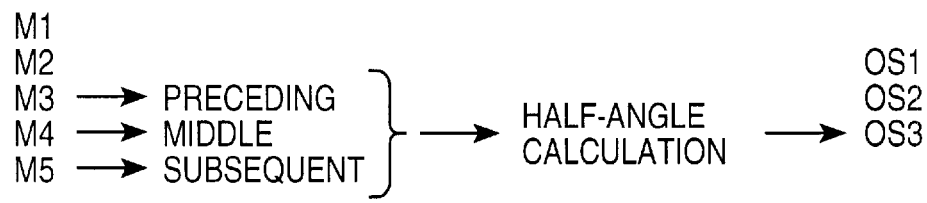
FIG. 4C shows a third offset point being computed from preceding, middle and subsequent points in accordance with the teachings of the present invention.
Figure 4D:
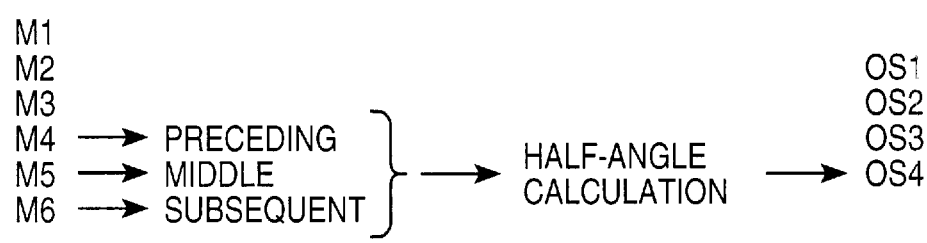
FIG. 4D shows a fourth offset point being computed from preceding, middle and subsequent measured points in accordance with the teachings of the present invention.

FIGS. 4A through 4D illustrate the order and timing in which continuous offset points may be computed from measured points using half angle calculations in accordance with the teachings of the present invention. As shown in FIG. 4A, measured points M1, M2 and M3 are assigned designations of preceding, middle and subsequent points respectively. As soon as measured point M3 has been measured, a half angle calculation may be performed which results in the first offset point OS1. After measured point M4 is determined, measured points M2, M3 and M4 are assigned designations of preceding, middle and subsequent. Accordingly, the second offset point OS2 may be computed by the present invention using a half angle calculation. The third offset point, OS3, is computed by the present invention using a half angle calculation as soon as the fifth measured point M5 is determined. Note that measured points M3, M4 and M5 are designated as preceding, middle and subsequent in the computation of offset point OS3. Similarly, as soon as measured point M6 is generated, measured points M4, M5 and M6 are assigned designations of preceding, middle and subsequent respectively. A half angle calculation is performed by the present invention on measured points M4 through M6 resulting in the computation of the fourth offset point OS4.

Figure 5:
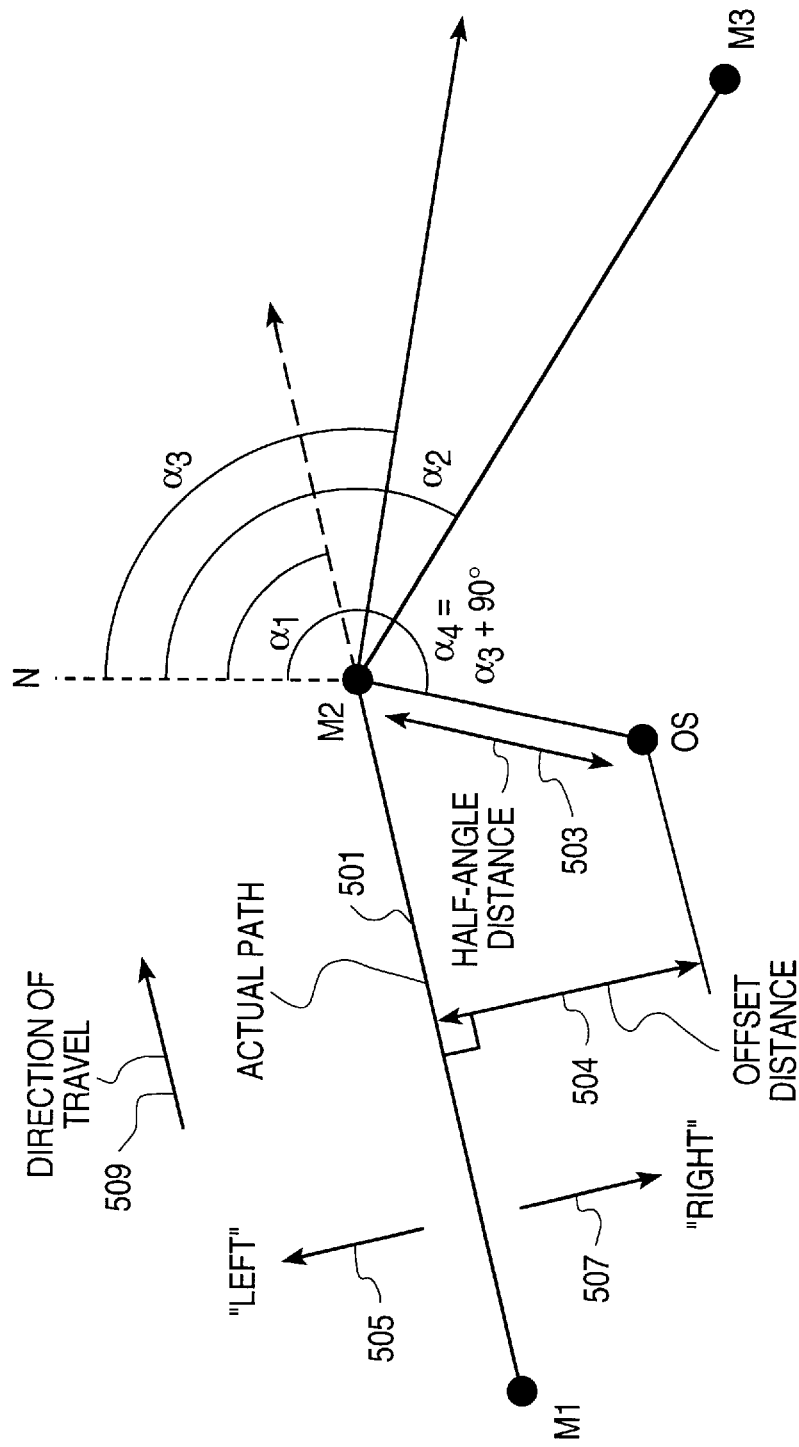
FIG. 5 shows an offset point in relation to measured points and corresponding azimuths in accordance with the teachings of the present invention.

FIG. 5 shows the calculations used in one embodiment of the present invention to compute an offset point OS from a middle measured point M2 and its preceding and subsequent measured points M1 and M3 respectively. It is noted that measured points M1, M2 and M3 form actual path 501. An operator using the presently described mobile surveying device may travel along actual path 501 in the direction of travel 509 as shown in FIG. 5. The operator using the presently described mobile surveying device may activate selectively the continuous offset feature of the present invention and specify whether the offset point should be to the "left" 505 of the actual path 501 or to the "right" 507 of the actual path 501. In addition, the operator may specify a right angle offset distance 504 at which offset points will offset from actual path 501. Offset distance 504 includes vertical and horizontal offset components (not shown). As will be described, half angle distance 503 is computed from the offset distance 504 relative to the angles formed with measured points M1, M2 and M3.

Specifically, offset point OS is computed immediately after measured points M1, M2 and M3 have been measured. Azimuth $\alpha_1$ is first computed. As shown in FIG. 5, $\alpha_1$ is the azimuth from measured point M1 to measured point M2. As also shown in FIG. 5, azimuth measurements in one embodiment of the present invention are the horizontal angles measured clockwise from the north. It is appreciated that other embodiments of the present invention may use different reference directions other than north so long as the half angle calculations described herein may be realized. Azimuth $\alpha_2$, which is shown as the horizontal angle measured clockwise from the north to the line formed between measured point M2 and M3. Next, the mean angle $\alpha_3$ is computed using the following equation:

$$\alpha_3 = \frac{(\alpha_2 + \alpha_1)}{2} \quad \text{(Equation 1)}$$

After $\alpha_3$ is calculated, the present invention then determines whether the offset direction is "left" 505 or "right" 507. Next $\alpha_4$ is computed by either adding 90 degrees to $\alpha_3$ or subtracting 90 degrees from $\alpha_3$. If the offset is to the "right" 507 of the actual path 501, as shown in the example illustrated in FIG. 5, then 90 degrees is added to $\alpha_3$ to compute $\alpha_4$. If, in the alternative, the offset is to the "left" 505 of actual path 501, then 90 degrees is subtracted from $\alpha_3$ to compute $\alpha_4$. In the example shown in FIG. 5, the operator specified offset is "right" 507 and $\alpha_4$ therefore equals $\alpha_3$ plus 90 degrees. After $\alpha_4$ is computed, half angle distance 503 is computed using the following equation:

$$\text{half angle distance} = \frac{\text{offset distance}}{\sin(\alpha_4 - \alpha_2)} \quad \text{(Equation 2)}$$

Next, offset point OS is computed to be along azimuth $\alpha_4$ from M2 at a half angle distance 503.

In one embodiment of the present invention, offset point OS is a ground vector with an ellipsoidal distance equal to the horizontal half angle distance from M2 and with a vertical geoidal distance equal to the vertical distance offset from M2 at a great azimuth equal to $\alpha_4$. Offset point OS is stored in memory in the presently described mobile surveying device and the continuous offset process is repeated with each new measured point collected. Afterwards, the stored offset points may be retrieved from memory for subsequent use and analysis.

In one embodiment of the present invention, the calculation of the azimuth $\alpha_4$ itself is approximated for speed considerations. In particular, complex full ellipsoid calculations are unnecessary given the typical offset magnitudes utilized with the presently described mobile surveying device. The approximation method utilized in one embodiment of the present invention pertains to the way the azimuth between successive continuous points are computed. The resultant ground vector requires a grid azimuth between two points on a Cartesian grid. Referring to FIG. 5, measured points M1, M2 and M3 are measured and stored as earth centered earth fixed (ECEF) coordinates and would have to be converted to projection coordinates in order to determine the necessary grid azimuth. To avoid the time needed for these conversions, one embodiment of the present invention determines a convergence to apply to azimuthal computations on an ECEF sphere. This requires that the ECEF coordinates be converted to ellipsoidal latitude, longitude and height. Accordingly, spherical calculations are used to determine the azimuth between the two points in question and the convergence is applied. In one embodiment of the present invention, the convergence is recomputed periodically to ensure adequate approximations.

In sum, a method and an apparatus which determines an offset path from an actual path using a mobile surveying device is provided with the present invention. The present invention provides continuous offsetting of survey points by half angle calculations in real time in the field. The continuous offsetting of the present invention provides for calculation and storage of points offset from points actually measured which allows the surveying of paths which could not otherwise be occupied directly.

In the foregoing detailed description, a method and apparatus has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. In a mobile surveying device, a method of determining an offset path offset from an actual path, the method comprising the steps of:

measuring a sequence of continuous measured points along the actual path, wherein the sequence of continuous measured points are generated using a satellite positioning system included with the mobile surveying device;

assigning sequentially a preceding, a middle and a subsequent measured point in the sequence of continuous measured points; and computing an offset point of the offset path corresponding with the middle measured point immediately after the subsequent point is measured, the offset point being computed using a half-angle calculation relative to an angle defined by the middle measured point and the preceding and subsequent measured points.

2. The method described in claim 1 including the additional steps of:

assigning sequentially a next preceding, a next middle and a next subsequent measured point in the sequence of continuous measured points; and computing a next offset point included in the offset path immediately after the next subsequent point is measured, the next offset point corresponding with the next middle measured point, the next offset point being computed using the half-angle calculation relative to an angle defined by the next middle measured point and the next preceding and next subsequent measured points.

3. The method described in claim 2 wherein the next preceding and the next middle measured points correspond with the middle and the subsequent measured points, respectively.

4. The method described in claim 1 wherein the offset point is in an offset direction from the middle measured point.

5. The method described in claim 1 wherein the offset point is a computed half angle distance from the middle measured point.

6. The method described in claim 5 wherein the offset point is computed using an offset distance from the actual path.

7. The method described in claim 6 wherein the offset distance includes a horizontal offset distance and a vertical offset distance.

8. The method described in claim 1 including the additional step of storing the offset point.

9. The method described in claim 8 wherein the offset point is stored as a ground vector from the second measured point.

10. The method described in claim 1 wherein the satellite positioning system is a global positioning system.

11. The method described in claim 1 wherein the computing step comprises the steps of:

computing a first azimuth from the preceding measured point to the middle measured point;

computing a second azimuth from the middle measured point to the subsequent measured point;

computing a third azimuth, the third azimuth being a mean angle of the first and second azimuths;

computing a fourth azimuth equal to 90 degrees subtracted from the third azimuth if an offset direction is in a first direction;

computing the fourth azimuth equal to 90 degrees added to the third azimuth if the offset direction is in a second direction; and defining the next offset point as a ground vector at a horizontal distance and at a vertical distance from the actual path and a half angle distance from the middle measured point along the fourth azimuth.

12. A mobile surveying device for determining an offset path from an actual path, the mobile surveying device comprising:

satellite positioning system circuitry configured to generate a sequence of continuous measured points along the actual path; the sequence of continuous measured points including preceding, middle and subsequent measured points;

computation circuitry coupled to receive the preceding, middle and subsequent measured points, the computation circuitry further coupled to receive an offset distance and an offset direction, the computation circuitry configured to compute an offset point immediately after the subsequent measured point is generated, the offset point being computed using a half-angle calculation relative to an angle defined by the middle measured point, the preceding and subsequent measured points; and memory circuitry coupled to the computation circuitry for storing the offset point.

13. The mobile surveying device described in claim 12 wherein the satellite positioning system circuitry is further configured to generate a next preceding, a next middle, and a next subsequent measured point included in the sequence of continuous measured points along the actual path.

14. The mobile surveying device described in claim 13 wherein the computation circuitry is further configured to compute a next offset point immediately after the next subsequent measured point is generated, the computation circuitry computing the next offset point using the half-angle calculation relative to an angle defined by the next middle measured point, the next preceding and next subsequent measured points.

15. The mobile surveying device described in claim 14 wherein the offset path further comprises the next offset point.

16. The mobile surveying device described in claim 14 wherein the memory circuitry is further configured to store the next offset point.

17. The mobile surveying device described in claim 12 wherein the satellite positioning system circuitry is a global positioning system.

18. The mobile surveying device described in claim 12 further comprising input/output circuitry configured to receive the offset distance and the offset direction.

19. The mobile surveying device described in claim 12 wherein the offset distance includes a horizontal offset distance and a vertical offset distance.

20. The mobile surveying device described in claim 12 wherein the half-angle calculation includes a computation of a half-angle distance relative to the middle measured point, the preceding and subsequent measured points, the offset point being the half angle distance from the middle measured point.

* * * * *

UNITED STATES PATENT AND TRADEMARK OFFICE
CERTIFICATE OF CORRECTION

PATENT NO. : 5,831,573
DATED : November 3, 1998
INVENTOR(S) : Craig D. Muir

It is certified that error appears in the above-indentified patent and that said Letters Patent is hereby corrected as shown below:

ON THE TITLE PAGE
Item [54]

In the title of the invention delete "CONTINOUSLY" and insert --CONTINUOUSLY--

In column 2 at line 24 delete "transverses" and insert --traverses--

In column 8 at line 16 delete "path;" and insert --path,--

Signed and Sealed this

Twenty-seventh Day of March, 2001

Attest:

NICHOLAS P. GODICI

Attesting Officer

Acting Director of the United States Patent and Trademark Office